(12) United States Patent
Kang et al.

(10) Patent No.: US 8,416,794 B2
(45) Date of Patent: Apr. 9, 2013

(54) METHOD FOR SUB-PACKET GENERATION WITH ADAPTIVE BIT INDEX

(75) Inventors: Seung Hyun Kang, Gyeonggi-do (KR); Young Woo Yun, Gyeonggi-do (KR); Ki Jun Kim, Gyeonggi-do (KR); Jae Hoon Chung, Gyeonggi-do (KR); Suk Hyon Yoon, Gyeonggi-do (KR); Joon Kui Ahn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/664,383

(22) PCT Filed: Jun. 13, 2008

(86) PCT No.: PCT/KR2008/003344
§ 371 (c)(1),
(2), (4) Date: Dec. 11, 2009

(87) PCT Pub. No.: WO2008/153353
PCT Pub. Date: Dec. 18, 2008

(65) Prior Publication Data
US 2010/0195662 A1    Aug. 5, 2010

Related U.S. Application Data

(60) Provisional application No. 60/946,403, filed on Jun. 27, 2007.

(30) Foreign Application Priority Data

Jun. 13, 2007 (KR) .................. 10-2007-0057725
Sep. 19, 2007 (KR) .................. 10-2007-0095308
Oct. 29, 2007 (KR) .................. 10-2007-0108803

(51) Int. Cl.
*H04L 12/28*    (2006.01)

(52) U.S. Cl.
USPC .......................................................... 370/412

(58) Field of Classification Search .................. None
See application file for complete search history.

(56) References Cited

U.S. PATENT DOCUMENTS 6,023,783 A * 2/2000 Divsalar et al. ............... 714/792
6,298,463 B1 * 10/2001 Bingeman et al. ............ 714/786
(Continued)

FOREIGN PATENT DOCUMENTS
EP    1257081    11/2002

OTHER PUBLICATIONS

Motorola, "Redundancy Version Definition for Circular Buffer Rate Matching," R1-072138, May 2007, XP-002504204.

(Continued)

*Primary Examiner* — Hassan Phillips
*Assistant Examiner* — Mark A Mais
(74) *Attorney, Agent, or Firm* — Lee, Hong, Degerman, Kang & Waimey

(57) ABSTRACT

A method of generating a sub-packet in consideration of an offset is disclosed. A method of generating a sub-packet in consideration of an offset, for re-transmission of a packet from systematic bits and parity bits stored in a circular buffer includes turbo-coding an input bitstream at a predetermined code rate and generating and storing the systematic bits and the parity bits in the circular buffer, and deciding a starting position of the sub-packet in the circular buffer in consideration of the offset for puncturing at least a portion of the systematic bits of the circular buffer. Accordingly, it is possible to efficiently decide the starting position of the sub-packet to be transmitted adaptively with respect to a variable packet length, improving a coding gain, reducing complexity and reducing a calculation amount.

17 Claims, 6 Drawing Sheets

U.S. PATENT DOCUMENTS

| | | | |
|---|---|---|---|
| 7,099,298 B2 | 8/2006 | Kim | |
| 7,200,796 B2 * | 4/2007 | Kim et al. | 714/790 |
| 2002/0181603 A1 * | 12/2002 | Kim et al. | 375/265 |
| 2003/0174642 A1 | 9/2003 | Yang et al. | |

OTHER PUBLICATIONS

Samsung, "Implementation Considerations for Circular Buffer Rate Matching," 3GPP TSG RAN WG1 Meeting #49, R1-072552, May 2007, XP-050106259.

LG Electronics, "An RV Definition Scheme with Variable Starting Positions," 3GPP TSG RAN WG1 Meeting #49bis, R1-072865, Jun. 2007, XP-050106545.

LG Electronics, "An RV Definition Scheme with Variable Starting Positions," 3GPP TSG RAN WG1 Meeting #49bis, R1-073200, Jun. 2007, XP-050106834.

* cited by examiner

METHOD FOR SUB-PACKET GENERATION WITH ADAPTIVE BIT INDEX

CROSS-REFERENCE TO RELATED APPLICATIONS

This application is the National Stage filing under 35 U.S.C. §371 of International Application No. PCT/KR2008/003344, filed on Jun. 13, 2008, which claims the benefit of earlier filing date and right of priority to Korean Patent Application Nos. 10-2007-0108803, filed on Oct. 29, 2007, 10-2007-0095308, filed on Sep. 19, 2007, and 10-2007-0057725, filed on Jun. 13, 2007, and also claims the benefit of U.S. Provisional Application Ser. No. 60/946,403, filed on Jun. 27, 2007.

TECHNICAL FIELD

The present invention relates to a method of re-transmitting a packet, and more particularly, to a method of generating a sub-packet in consideration of an offset, which is capable of reducing complexity and improving a coding gain at the time of rate matching in a hybrid automatic repeat request (HARQ) method.

BACKGROUND ART

A next-generation mobile communication system requires a high data transmission rate and reliable transmission. Accordingly, a robust channel coding method is required. Since a turbo code has a structure in which two recursive convolutional codes are concatenated in parallel with an interleaver interposed therebetween and has excellent performance because a channel capacity is close to Shannon capacity, the turbo code is called a channel code suitable for the next-generation mobile communication system.

FIG. 1 is a block diagram showing the configuration of a general apparatus for encoding a turbo code.

A first constituent encoder 1 receives and encodes information bits and generates first redundant bits and a second constituent encoder 3 receives and encodes the information bits rearranged by an encoder interleaver 2 and generates second redundant bits. In the turbo encoding, the first or second redundant bits are parity bits.

For highly reliable decoding of the apparatus for decoding the turbo code, the constituent encoders of the apparatus for encoding the turbo code employs a method of inserting a tail bit and forcedly ending trellis or a circular coding method. In the circular coding method, since an initial state and a final state of the trellis are equally set and an additional bit is not inserted, band efficiency is higher than the method of inserting the tail bit. Here, the initial state and the final state are called a circular state. In order to decide the circular state, the initial state is set to a zero state, encoding is performed, and the final state is obtained. The circular state can be calculated using the final state and a specific encoder structure. In addition, the calculated circular state is set to the initial state and encoding is performed again, thereby generating the redundant bits.

FIG. 2 is a block diagram showing the configuration of a general apparatus for decoding a turbo code.

The information bit sequence and the first and second redundant bit sequences output from the apparatus of FIG. 1 are modulated and the modulated bit sequences are transmitted to a receiver having the apparatus for decoding the turbo code of FIG. 2. The receiver receives and demodulates the modulated bit sequences and supplies the demodulated bit sequences to the apparatus for decoding the turbo code of FIG. 2.

A first constituent decoder 4 receives and decodes the demodulated information bit sequence and the demodulated first redundant bit sequence and computes extrinsic information of the first constituent decoder 4. A decoder interleaver 5' rearranges the extrinsic information of the first constituent decoder 4 and outputs the rearranged extrinsic information to a second constituent decoder 6. The second constituent decoder 6 receives and decodes the demodulated information bit sequence, the demodulated second redundant bit sequence and the extrinsic information of the first constituent decoder rearranged by the decoder interleaver 5 and computes extrinsic information of the second constituent decoder 6. A decoder deinterleaver 7 rearranges the extrinsic information of the second constituent decoder 6 and outputs the rearranged extrinsic information to the first constituent decoder 4. The above-described process corresponds to a first iterative decoding process. Such an iterative decoding process is performed until desired decoding performance is obtained.

The apparatus for decoding the turbo code includes a plurality of constituent decoders. The constituent decoders compute various types of metrics and perform a decoding operation. Such metrics include transition metrics, forward metrics and backward metrics. A log likelihood ratio (LLR) of the information bits is calculated on the basis of the forward and backward metrics.

Meanwhile, the HARQ is known well as a link control protocol for requesting re-transmission of a packet to a transmitter in the case where an error occurs in the packet received by the receiver.

The packet re-transmission operation using the HARQ is divided into a rate matching process performed by the transmitter and a de-rate matching process performed by the receiver. In particular, a process of converting a codeword packet encoded at a mother code rate into a sub-packet having a size to be transmitted by the transmitter is called sub-packet generation or rate matching (RM).

An example of the rate matching includes circular buffer based rate matching (CBRM). In order to generate the sub-packet using the CBRM, first, a codeword packet having a mother code rate is stored in a bitwise circular buffer (CB). Here, the CB indicates a buffer having circular characteristics in which, when the buffer is accessed, a first bit index of the buffer is accessed after a last bit index of the buffer is accessed. The sub-packets necessary for transmission are consecutive indexes of the buffer and are generated by retrieving a portion of the codeword packet stored in the circular buffer. At this time, in the CB, an index of a buffer in which the sub-packet is started is called a starting position and an index of a buffer in which the sub-packet is ended is called an ending position.

Several sub-packets used for initial transmission and re-transmission using the HARQ method are generated from one codeword packet. The several sub-packets generated at that time can be identified by the length of the sub-packets and the starting positions of the sub-packets. Each of the sub-packets which can be identified is called a redundancy version (RV) and RV information indicates the agreed starting position of the RV.

In each HARQ transmission, the transmitter Tx transmits the sub-packets via a data channel and transmits the RV information of the generated sub-packets via a control channel. The receiver Rx maps the sub-packets received via the data channel to the accurate position of the codeword packet using the RV information received via the control channel.

The circular buffer is divided into a physical circular buffer and a virtual circular buffer according to implementation methods.

First, in the case where the physical circular buffer is used, when the codeword packet which is forward error correction (FEC)-encoded at the mother code rate is stored in the CB, systematic bits and parity bits of the codeword packet are interleaved on the sub-block level, the interleaved systematic bits are first stored in the CB, and the interleaved parity bits are then stored in the CB. At this time, filler bits inserted into the codeword packet and dummy bits inserted for interleaving may be removed. If the filler bits and the dummy bits are not removed, the filler bits and the dummy bits may be removed in the process of generating the sub-packets, if necessary.

In the virtual circular buffer, a memory having a matrix shape, which is used for interleaving the systematic bits and the parity bits, is used instead of using an additional circular buffer memory. First, the codeword packet which is FEC-encoded at the mother code rate is stored in an interleaver matrix in order to divide the codeword into the systematic bits and the parity bits and interleave the systematic bits and the parity bits. When the sub-packets are generated from the stored codeword packet, the memory is accessed in consideration of an interleaving pattern.

Hereinafter, a fixed or adaptive RV of the CBRM using the physical circular buffer will be described.

The sub-packets necessary for all the HARQ transmission may be generated by selecting one of V starting position candidates. Accordingly, the RV information indicates one of V agreed starting positions regardless of the number of times of HARQ transmission.

A method of defining the RV information indicating the starting position for generating the sub-packet includes a fixed RV and an adaptive RV.

In the fixed RV, in order to obtain an average HARQ gain regardless of the variable length of the sub-packet in each HARQ transmission, the size N of the circular buffer is divided by the number V of starting position candidates, and V fixed positions are defined on the circular buffer at a gap of N/V therebetween.

In the case where the fixed RV is used, since adaptability for the variable length of the sub-packet deteriorates, an overlapping portion between sub-packets used for the HARQ transmission and re-transmission is increased. Since a portion of the codeword packet, which is not transmitted, is increased as the overlapping portion between the sub-packets is increased, a HARQ coding gain cannot be sufficiently obtained. If a larger number of starting position candidates are used in order to obtain the sufficient HARQ coding gain and reduce the gap between the starting positions of the fixed RV, a larger amount of control information should be used in order to transmit the RV information via the control channel.

FIG. 3 is a view showing an embodiment of the HARQ transmission in the case where the starting positions of four fixed RVs are used. In FIG. 3, it is assumed that a static channel is used and the length of the sub-packet used for each HARQ transmission is constant and is greater than N/3 or less than N/2.

In FIG. 3, a first transmission indicates a sub-packet used for initial transmission using the HARQ Method and other transmissions indicate sub-packets which are re-transmitted three times using the HARQ method. Meanwhile, in FIGS. 3 to 7, N indicates the size of the CB. FIG. 3 shows the case where the overall codeword packet stored in the circular buffer cannot be transmitted although the length of the sub-packet used for HARQ transmission is equal to or greater than N/3 and the initial transmission and two re-transmissions are performed. The adaptive RV is developed for solving the disadvantages of the fixed RV.

The adaptive RV is a method of defining the starting position of the RV using the variable length of the sub-packet used for each HARQ transmission. When the length of the codeword packet encoded at the mother code rate is N and the length of the sub-packet used for an $i^{th}$ HARQ transmission is $L_i$, a $j^{th}$ starting position $S_{i,j}$ of the circular buffer for generating the sub-packet is expressed by Equation 1.

$$S_{i,j}=j*L_i \bmod N \qquad \text{Equation 1}$$

Equation 1 indicates the V starting position candidates for generating the sub-packet which will be transmitted in the $i^{th}$ HARQ transmission when j=0, 1, . . . , and V−1. In the $i^{th}$ HARQ transmission, since the transmitter has information on the starting positions and the ending positions of all the sub-packets used before the $i^{th}$ HARQ transmission, a sub-packet having a smallest overlapping portion between the sub-packet transmitted previously and the sub-packet which will be transmitted in the $i^{th}$ HARQ transmission or a sub-packet having a minimized gap with the position of the sub-packet transmitted previously may be selected and transmitted. It is possible to increase the HARQ coding gain by the selection of the sub-packet. FIG. 4 is a view showing a method of selecting and transmitting the sub-packet having a minimized gap with the position of the sub-packet transmitted previously.

In each transmission, the transmitter transmits the sub-packet via the data channel and transmits the RV information via the control channel. The RV information $RV_i=j$ indicates the agreed starting position $S_{i,j}$ obtained by Equation 1. The receiver can map the sub-packet transmitted via the data channel to the accurate position of the codeword packet using the RV information transmitted via the control channel.

FIG. 5 is a view showing an embodiment of the HARQ transmission using the starting positions of four adaptive RVs using Equation 1. In FIG. 5, it is assumed that a static channel is used and the length of the sub-packet used for each HARQ transmission is constant and is greater than N/3 or less than N/2, similar to FIG. 3.

Accordingly, the starting position of $RV_i=j$ obtained by Equation 1 always indicates the same starting position $S_{i,j}$, regardless of i. Compared with FIG. 3, if the length of the sub-packet used for each HARQ transmission is identical and the length of the sub-packet is equal to or greater than N/3, it can be seen that the overall codeword packet stored in the circular buffer can be transmitted by three transmissions. Accordingly, it is possible to obtain a maximum coding gain by a smaller number of times of HARQ re-transmission.

In FIG. 5, the length of the sub-packet transmitted for each HARQ transmission is not changed. If the adaptive RV is used, since the gap between the starting position candidates used for all the HARQ transmissions is equal to the length of the sub-packet, incremental redundancy (IR) having the characteristics that the sub-packets used for all the HARQ transmissions are maximally orthogonal to each other can be realized.

Generally, in the initial transmission using the HARQ method, priority is given to the systematic bits of the codeword packet and the sub-packet including all the systematic bits is first transmitted.

In the conventional method of generating the sub-packet, since puncturing of the systematic bits for improving performance is not considered when the starting position of the sub-packet to be transmitted adaptively is decided with respect to a variable packet length, it is difficult to obtain a sufficient HARQ gain.

DISCLOSURE

Technical Problem

An object of the present invention devised to solve the problem lies on a simple method of increasing a coding gain at the time of the generation of a sub-packet in the case where a physical circular buffer is used and computing a gap between starting position candidates in the case where a virtual circular buffer is used, using an adaptive RV.

Another object of the present invention devised to solve the problem lies on a method of deciding a starting position in consideration of dummy bits and filler bits to be removed and a variable length of a sub-packet in the case where the virtual circular buffer is used.

Technical Solution

The object of the present invention can be achieved by providing a method of generating a sub-packet in consideration of an offset, for re-transmission of a packet from a codeword stored in a circular buffer.

In an aspect of the present invention, provided herein is a method of generating a sub-packet in consideration of an offset, for re-transmission of a packet from systematic bits and parity bits stored in a circular buffer, the method including: turbo-coding an input bitstream at a predetermined code rate and generating and storing the systematic bits and the parity bits in the circular buffer; and deciding a starting position of the sub-packet in the circular buffer in consideration of the offset for puncturing at least a portion of the systematic bits of the circular buffer.

Preferably, the method may further include transmitting information on the starting position to a transmitter using an identifier of the sub-packet.

Preferably, the offset may be a value which varies according to the identifier of the sub-packet.

Preferably, the deciding of the starting position may include deciding the starting position of the sub-packet in consideration of the offset in an initial transmission and deciding the starting position without considering the offset after the initial transmission.

The deciding of the starting position may include deciding the starting position of the sub-packet without considering the offset in an initial transmission and deciding the starting position in consideration of the offset after the initial transmission.

The deciding of the starting position may include deciding a remainder obtained by dividing a value, which is obtained by multiplying the identifier of the sub-packet by the length of the sub-packet and adding the offset to the multiplied result, by the size of the circular buffer, as the starting position.

In another aspect of the present invention, provided herein is a method of generating a sub-packet in consideration of an offset, for re-transmission of a packet from a codeword stored in a circular buffer having a matrix shape, the method including: turbo-coding an input bitstream at a predetermined code rate and generating and storing systematic bits and parity bits in the circular buffer having the matrix shape; and skipping a column or a column index of the circular buffer such that at least a portion of the systematic bits is punctured and deciding an initial starting position of an initial transmission.

Preferably, a process of deciding the starting position of the remaining sub-packet may include deciding the starting position of the remaining sub packet inconsideration of a sub-packet sequence, a starting position interval and an initial starting position. In particular, the starting position interval is an interval for skipping the dummy bits and the filler bits inserted into the codeword in the sub-packet generated by the transmitter.

Preferably, the method may further include deciding a starting position interval of a column index unit for skipping at least one of dummy bits, filler bits and the parity bits generated by the filler bits, which are inserted into the codeword.

Preferably, the deciding of the starting position interval may include obtaining a dividend by multiplying the starting position interval by an identifier of the sub-packet and adding the initial starting position to the multiplied result; and deciding a remainder obtained by dividing the dividend by the size of the column of the circular buffer as the start position of the remaining sub-packet.

Preferably, the deciding of the starting position interval may include dividing the length of the sub-packet generated by the transmitter by a value obtained by subtracting the number of dummy bits and the number of filler bits from the size of the circular buffer; and converting the divided value into a column interval on the circular buffer. At this time, the converting of the divided value into the column interval may include performing any one of floor, ceil or round with respect to a value obtained by multiplying the divided value by the size of the column.

Preferably, the deciding of the starting position interval may include counting the number of bits excluding dummy bits and filler bits among the bits corresponding to the length of the sub-packet generated by the transmitter; and converting the counted value into a column interval on the circular buffer. At this time, the counting of the number of bits may include setting a value obtained by multiplying the initial starting position by the size of the row of the circular buffer as an initial value of the counted value. At this time, the converting of the counted value into the column interval may include performing any one of floor, ceil or round with respect to a value obtained by dividing the counted value by the size of the row.

In a further aspect of the present invention, provided herein is a method of generating and transmitting a sub-packet in consideration of an offset, for re-transmission of a packet from systematic bits and parity bits stored in a circular buffer, the method including: turbo-coding an input bitstream at a predetermined code rate and generating and storing the systematic bits and the parity bits in the circular buffer; deciding a starting position of the sub-packet in the circular buffer in consideration of the offset for puncturing at least a portion of the systematic bits of the circular buffer; reading the sub-packet having a predetermined length at the decided starting position; and transmitting the read sub-packet to a receiver.

Preferably, the offset may be a value which varies according to the identifier of the sub-packet.

Advantageous Effects

According to an embodiment of the present invention, it is possible to efficiently decide the starting position of a sub-packet to be transmitted adaptively with respect to a variable packet length, improving a coding gain, reducing complexity, and reducing a calculation amount.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
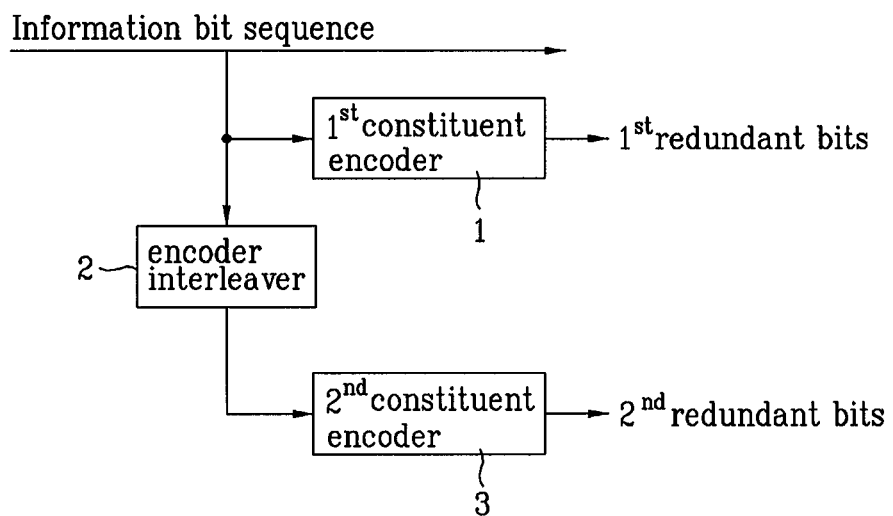
FIG. 1 is a block diagram showing the configuration of a general apparatus for encoding a turbo code.
Figure 2:
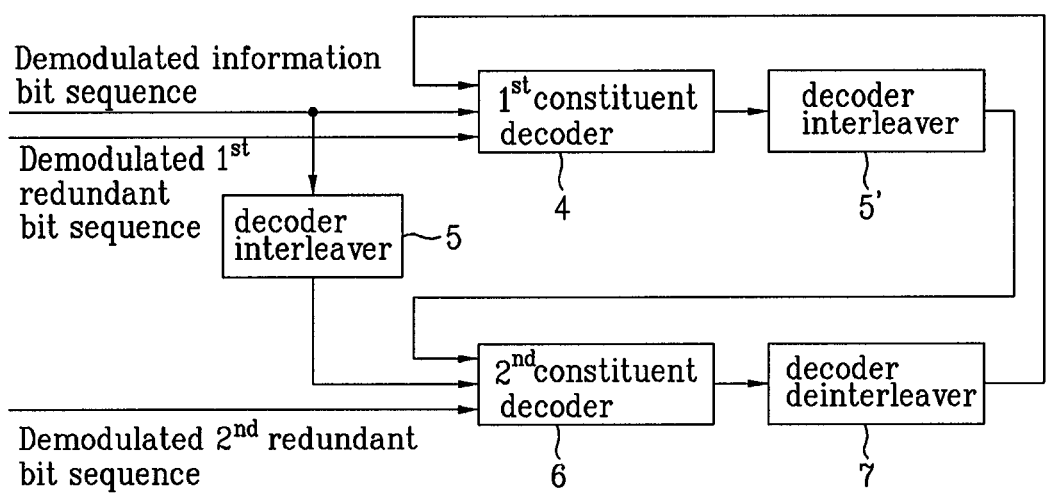
FIG. 2 is a block diagram showing the configuration of a general apparatus for decoding a turbo code.
Figure 3:
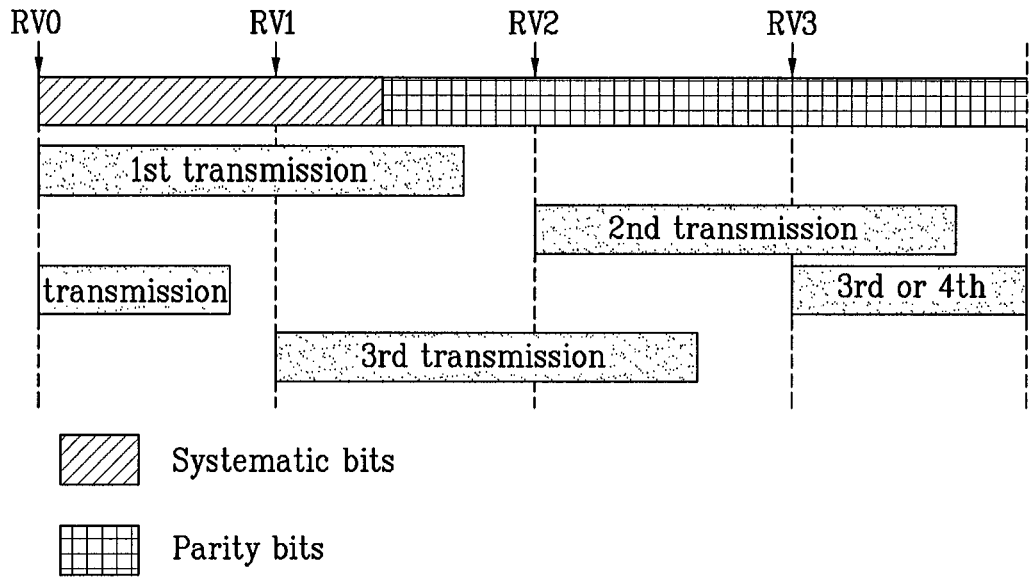
FIG. 3 is a view showing HARQ transmission in the case where a fixed starting position is used.
Figure 4:
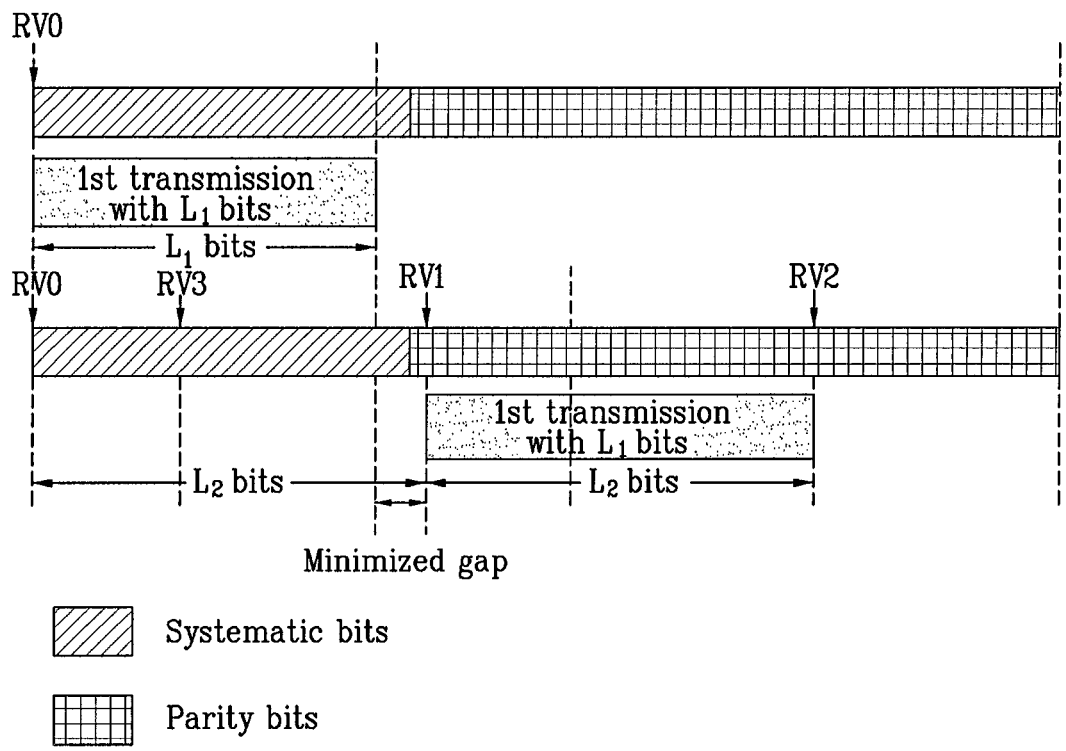
FIG. 4 is a view showing a method of selecting and transmitting a sub-packet having a minimized gap with the position of a sub-packet transmitted previously.
Figure 5:
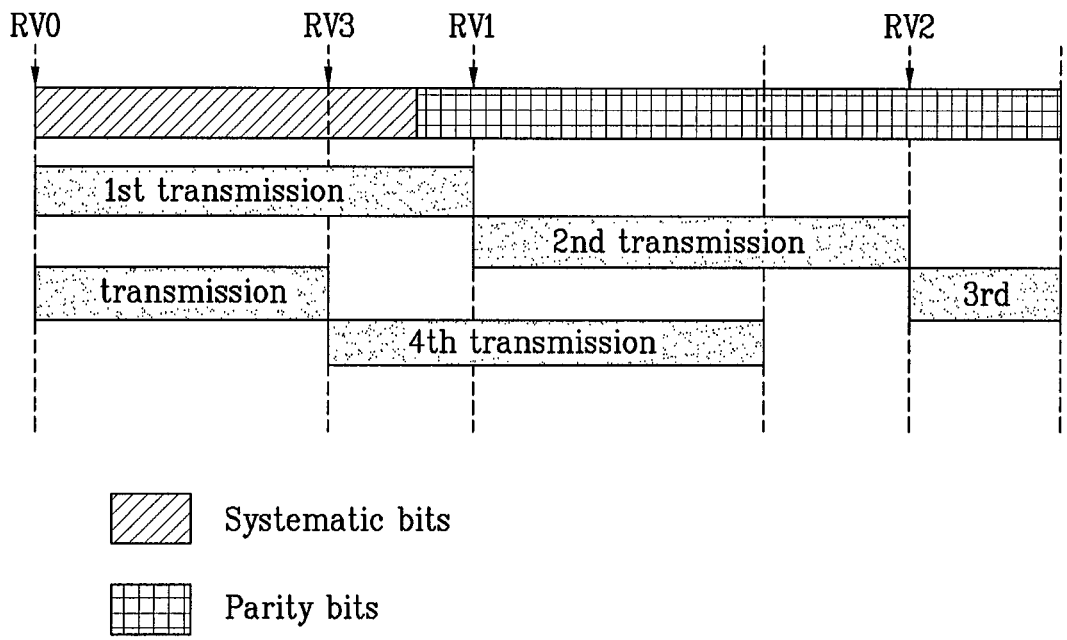
FIG. 5 is a view showing incremental redundancy of the HARQ transmission when the length of the sub-packet transmitted in each HARQ transmission using Equation 1 is not changed.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In general, in an initial transmission using a HARQ method, priority is given to systematic bits of a codeword packet and a sub-packet including all the systematic bits is first transmitted. However, when a predetermined portion of the systematic bits of the codeword is punctured at a high code rate, it is possible to improve the performance of the FEC.

Accordingly, in the case where the sub-packet having the high code rate should be transmitted in the initial transmission using the HARQ method, the starting position of the sub-packet which will be used for the initial transmission is decided such that the predetermined portion of the systematic bits are punctured.

An adaptive bit index based redundant version considering the puncturing of the systematic bits is described in a linear circular buffer as follows. That is, a method of deciding the starting position of the sub-packet necessary for the HARQ re-transmission in consideration of the amount of systematic bits punctured in the HARQ initial transmission is described as follows.

In the case where the sub-packet having the high code rate should be transmitted in the initial transmission using the HARQ method, the starting position of the sub-packet which will be used for the initial transmission is decided such that the predetermined portion of the systematic bits is punctured. In addition, in order to transmit the overall codeword packet stored in the circular buffer in the HARQ re-transmission, the sub-packet including the portion of the codeword packet punctured in the initial transmission is transmitted in the re-transmission step.

In the HARQ method using a circular buffer based rate matching (CBRM), when the codeword packet is stored in the circular buffer, the systematic bits are first stored. Accordingly, in order to generate the sub-packet in which the systematic bits to be used for the initial transmission are punctured, the starting position $S_{initial}$ of the sub-packet of the initial transmission is decided such that the index of the circular buffer is skipped by a necessary number.

In the HARQ method, in order to generate the sub-packet necessary for the re-transmission, the starting position $S_{initial}$ used for the initial transmission needs to be always considered. In the case where it is assumed that a static channel is used and the sub-packet in which the systematic bits are punctured is transmitted in the initial transmission, but the starting position of the sub-packet which will be used for the re-transmission is obtained by Equation 1 without considering the starting position $S_{initial}$ of the sub-packet of the initial transmission, the incremental redundancy (IR) having characteristics that the transmitted sub-packets are maximally orthogonal to each other can not be realized.

Figure 6:
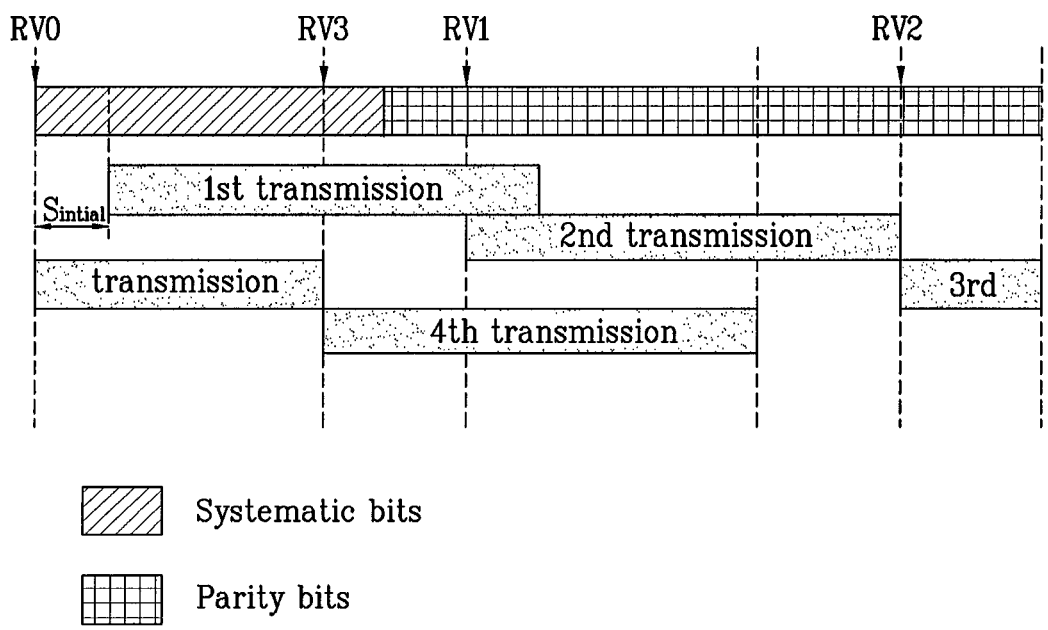
FIG. 6 is a view showing an example of a method of generating a sub-packet in consideration of an offset according to an embodiment of the present invention.

FIG. 6 is a view showing the starting position of the sub-packet of the HARQ re-transmission without considering the starting position $S_{initial}$ of the sub-packet of the initial transmission in the static channel.

From FIG. 6, it can be seen that the IR having the characteristic that the sub-packets are orthogonal to each other cannot be realized when the starting position of the sub-packet of the HARQ re-transmission without considering the starting position $S_{initial}$ in the static channel is used.

However, the present invention does not exclude the embodiment of FIG. 6. In addition, the starting position $S_{initial}$ may not be considered in the initial transmission and may be considered in the re-transmission method as one embodiment.

Hereinafter, in the case of using a physical circular buffer, the adaptive RV will be described.

In order to support the IR having the characteristics that the transmitted sub-packets are maximally orthogonal to each other in the case where the systematic bits are punctured in the static channel, an adaptive bit index based redundancy version (RV) considering an offset, that is, the starting position $S_{initial}$, is necessary. If the starting position $S_{initial}$ is considered, the starting position $S_{i,j}$ of a $j^{th}$ of a sub-packet represented by RV information $RV_i{=}j$ used for an $i^{th}$ HARQ transmission is expressed by Equation 2.

$$S_{i,j} = (j*L_i + S_{initial}) \bmod N \qquad \text{Equation 2}$$

Equation 2 expresses V starting position candidates for generating the sub-packet which will be used for the $i^{th}$ HARQ transmission when $j=0, 1, \ldots,$ and $V-1$. In the $i^{th}$ HARQ transmission, since a transmitter has information on the starting positions and the ending positions of all the sub-packets transmitted before the $i^{th}$ HARQ transmission, a sub-packet having a smallest overlapping portion between the sub-packet transmitted previously and the sub-packet which will be transmitted in the $i^{th}$ HARQ transmission or a sub-packet having a minimized gap with the position of the sub-packet transmitted previously may be selected and transmitted when the sub-packet which will be transmitted in the $i^{th}$ HARQ transmission is decided. The HARQ coding gain can be increased by the selection of the sub-packet. In addition, it is possible to decide the starting position of the sub-packet used for the initial transmission and the sub-packet necessary for the HARQ re-transmission by Equation 2. In addition, the offset, that is, the staring position $S_{initial}$, may vary according to the identifiers of the transmitted sub-packets.

It is assumed that the amount of punctured systematic bits is σ, the code rate of the sub-packet used for the initial transmission is $R_s$, and the threshold of the code rate for deciding the puncturing of the systematic bits is $R_\theta$. If $R_s > R_\theta$, the systematic bits are punctured. In other words, since the starting position $S_{initial}$ of the sub-packet used for the initial transmission is 0 or σ according to the threshold of the code rate, the starting position $S_{initial}$ may be expressed by Equation 3. If an optimized σ value exists regardless of $R_s$, the starting position $S_{initial}$ may be fixed to σ.

$$S_{initial} = \sigma \cdot [R_s/R_\theta] \quad \text{Equation 3}$$

Figure 7:
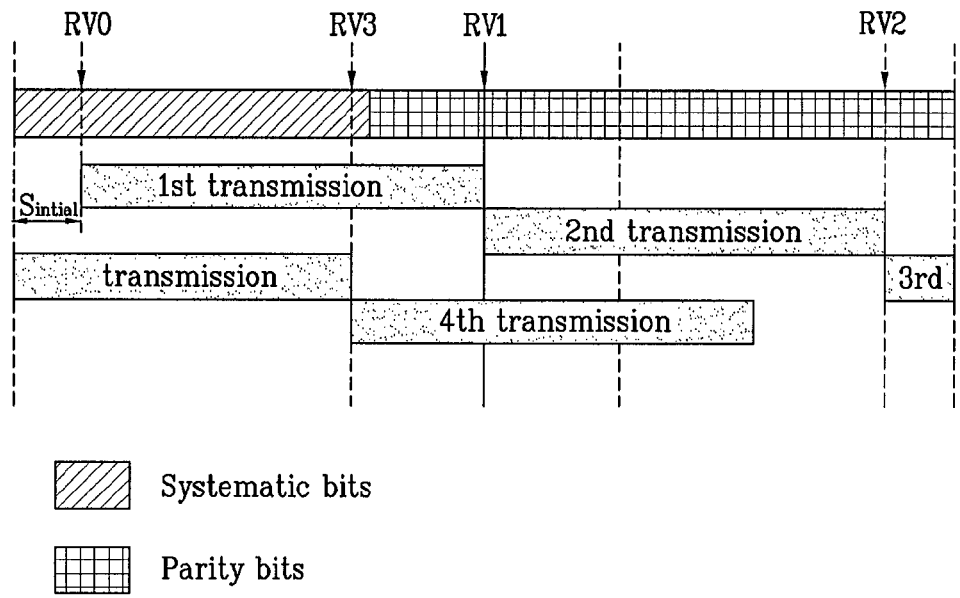
FIG. 7 is a view showing another example of the method of generating the sub-packet in consideration of an offset according to the embodiment of the present invention.

When the sub-packet is generated using Equation 2 in a state in which the static channel is used, the IR having the characteristics that the transmitted sub-packets are maximally orthogonal to each other can be realized as shown in FIG. 7.

Hereinafter, the case of using a circular buffer having a matrix shape will be described. In the case of using a virtual circular buffer, the starting position of the fixed RV uses V column indexes on a matrix memory. However, the adaptive RV requires a method of deciding a gap between starting position candidates expressed by the column index of the matrix memory in consideration of the variable length of the sub-packet and filler bits and dummy bits inserted.

In the virtual circular buffer, in order to obtain the gap between the starting position candidates of the RV, in the embodiment of the present invention, the virtual circular buffer may be constituted by an R×C matrix. In order to generate a sub-packet from a codeword packet stored in the circular buffer having the matrix shape, the circular buffer is accessed column by column or row by row in consideration of an interleaving pattern. Hereinafter, the case where the circular buffer is accessed column by column will be described. In the case where the circular buffer is accessed row by row, the column may be changed to the row and the description of the row may be changed to the column.

Accessing of the matrix row by row indicates that column elements in a leftmost column are accessed one by one from a $0^{th}$ row to an $R-1^{th}$ row. In other words, the V starting positions in the circular buffer having the matrix shape indicate V column indexes.

In the case where the circular buffer has a matrix structure and the length of the codeword is smaller than R×C, that is, is not a multiple of R or a multiple of C, since the matrix circular buffer cannot be filled by the codeword, dummy bits are filled in the matrix circular buffer. When the sub-packet is generated, the dummy bits are skipped. In addition, if the length of information bits input to the encoder is restricted and the length of systematic bits input to the encoder is smaller than the agreed length of information bits, filler bits are inserted into the information bits so as to be matched with the agreed length. In the case where the filler bits are inserted, the filler bits inserted into the information bits and parity bits generated by the inserted filler bits are present in the codeword. In this case, when the sub-packet is generated, all or a portion of the filler bits inserted when the circular buffer is accessed column by column and the parity bits generated by the filler bits are skipped.

In the case where the circular buffer is accessed column by column and the code rate is ⅓, the systematic bits of the codeword packet are stored in the column index c of $0 \leq c < C/3$ and the parity bits are stored in $C/3 \leq c < C$. Table 1 shows bit addresses when the circular buffer is accessed column by column.

TABLE 1

| | | Systematic bits | | | Parity bits | |
|---|---|---|---|---|---|---|
| 0 | R | ... R(C/3 − 1) | R(C/3) | R(C/3 + 1) | ... | R(C − 1) |
| 1 | R + 1 | ... R(C/3 − 1) + 1 | R(C/3) + 1 | R(C/3 + 1) + 1 | ... | R(C − 1) − 1 |
| ... | ... | ... ... | ... | ... | ... | ... ... |
| R − 1 | 2R + 1 | ... R(C/3) − 1 | R(C/3 + 1) − 1 | R(C/3 + 2) − 1 | ... | RC − 1 |

In the case where the circular buffer having the matrix shape is used, in order to simplify the generation of the sub-packet, the starting position of the sub-packet may be restricted to a position which becomes a multiple of R. In this case, the starting positions of all the sub-packets are restricted to column indexes.

The present embodiment relates to a method of deciding the adaptive starting position with respect to the variable length of the sub-packet in each HARQ transmission when the starting position is a multiple of R in the circular buffer having the R×C matrix shape. In more detail, the present embodiment relates to a method of deciding the starting position of the sub-packet according to the ending position of the previous adjacent sub-packet in consideration of the length of the sub-packet to be transmitted.

If the puncturing of the systematic bits is not considered in the HARQ initial transmission, the column address $A_{initial}$ of the starting position $S_{initial}$ is 0. If $A_{initial}$ columns are omitted in consideration of the puncturing of the systematic bits in the HARQ initial transmission, the column address $A_{initial}$ of the starting position $S_{initial}$ is $R \cdot \sigma_{initial}$. Accordingly, the starting position of the sub-packet is decided in consideration of $A_{initial}$ in all HARQ transmissions.

In the $i^{th}$ HARQ transmission, the starting position $S_j$ of the $j^{th}$ sub-packet represented by the RV information $RV_j$ is decided according to the ending position $E_{j-1}$ of a $j-1^{th}$ sub-packet. If the ending position $E_{j-1}$ is located at the matrix element $(r_{i-1}, c_{i-1})$, the column address $A_j$ of the starting position $S_j$ is expressed by Equation 4.

If $r_{i-j} \neq R-1$, $A_j = R \cdot c_{j-1}$      Equation 4

Otherwise, $A_j = R \cdot (c_{j-1} + 1)$

The column address $A_j$ is expressed by Equation 5.

$$A_j = R \cdot \{c_{j-1} + \text{ceil}(r_{j-1}/(R-1))\} \quad \text{Equation 5}$$

where, the ceil indicates a ceil operation. The column address $A_j$ of the starting position $S_j$ may be fixed to $R \cdot c_{j-1}$.

Figure 8:
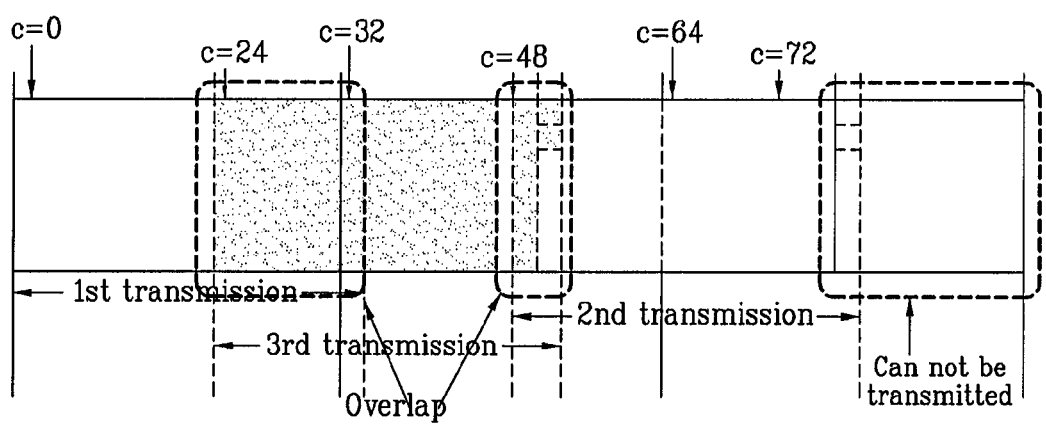
FIG. 8 is a view showing an example of a method of counting bits in a method of generating a sub-packet in consideration of an offset according to another embodiment of the present invention.

In FIG. 8, the start position candidates of the sub-packets which will be transmitted in the $i^{th}$ HARQ transmission are decided using Equation 4. In the $i^{th}$ HARQ transmission, since the transmitter Tx has information on the starting positions and the ending positions of all the sub-packets transmitted before the $i^{th}$ HARQ transmission, a sub-packet having a smallest overlapping portion between the sub-packet transmitted previously and the sub-packet which will be transmitted in the $i^{th}$ HARQ transmission or a sub-packet having a minimized gap with the position of the sub-packet transmitted previously may be selected and transmitted when the sub-packet which will be transmitted in the $i^{th}$ HARQ transmission is decided. The HARQ coding gain can be increased by the selection of the sub-packet.

If the channel is static and Equation 4 is used, the sub-packet transmitted in each HARQ transmission has 0 or one column index overlapping with the adjacent sub-packet and thus 0 to R−1 bits overlap with the bits of the adjacent sub-packet.

The case where the column indexes fixed in all the HARQ transmissions are used as the starting positions of the sub-packets is compared with Equation 4. It is assumed that a R*96 circular buffer is used, the channel is static, and the length L of the sub-packet to be transmitted is R*32<L<R*33.

If four fixed RVs are used, RV information RV0 is a $0^{th}$ column index, RV information RV1 is a $24^{th}$ column index, RV information RV2 is a $48^{th}$ column index, and RV information RV3 is a $72^{nd}$ column index. If the RV information RV0 is used in the initial transmission, the RV information RV2 is used in the second transmission, and the RV information RV1 or RV3 is used in the third transmission, the overlapping amount of the transmitted sub-packet can be minimized.

Figure 9:
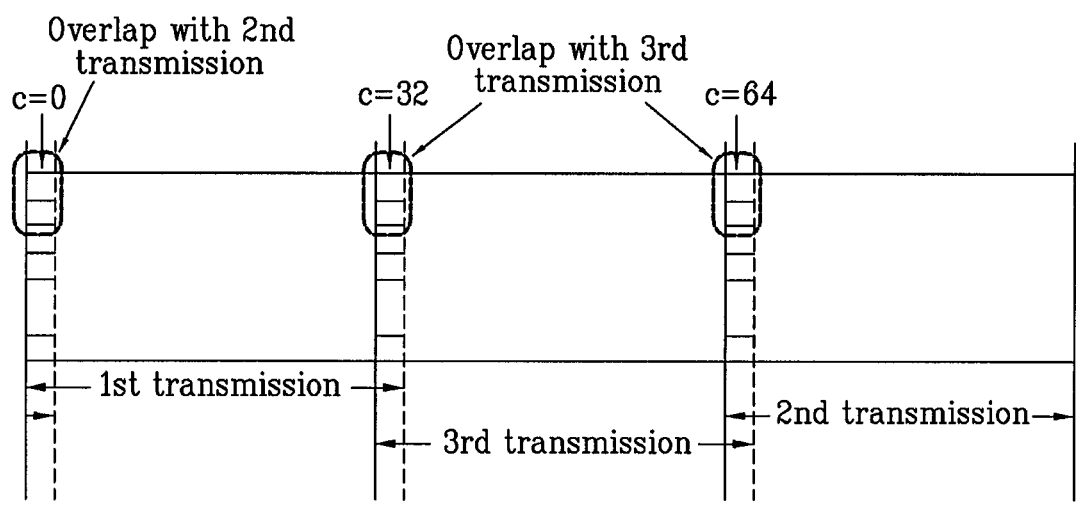
FIG. 9 is a view showing starting positions decided by counting bits in FIG. 8.

As shown in FIG. 9, if the $0^{th}$ column index is used in the initial transmission, a $64^{th}$ column index is used in the second transmission, and a $32^{nd}$ column index is used in the third transmission, the overlapping amount of the transmitted sub-packet can be minimized.

Figure 10:
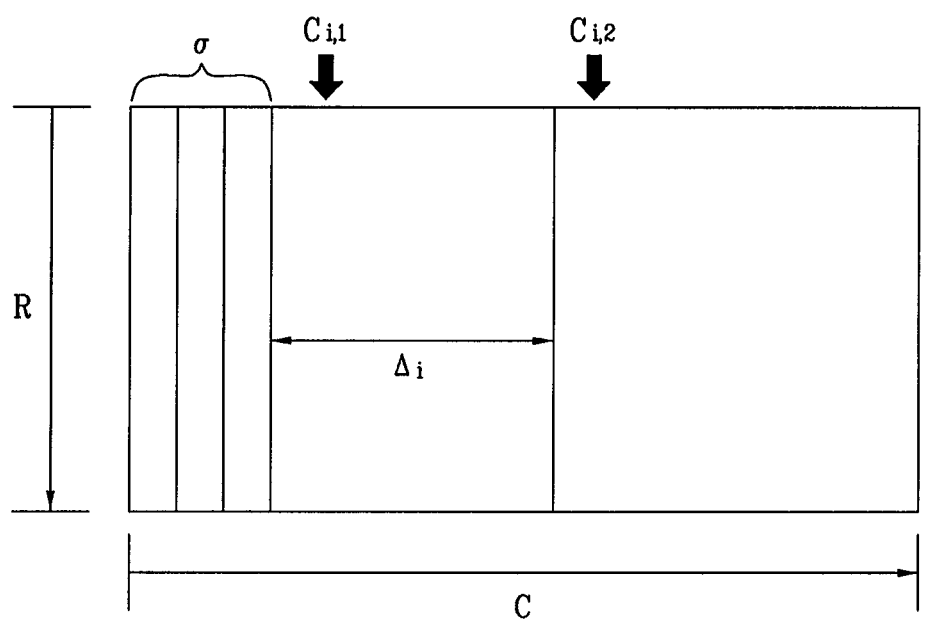
FIG. 10 is a view showing another example of the method of generating the sub-packet in consideration of the offset according to the embodiment of the present invention.

FIG. 10 is a view showing another example of a method of generating a sub-packet in consideration of an offset according to another embodiment of the present invention. The embodiment of FIG. 10 relates to a method of deciding the starting position with respect to the variable length of the sub-packet in each HARQ transmission in a circular buffer having an R×C matrix shape.

In the method of generating the sub-packet using the adaptive RV in the virtual circular buffer according to the present invention, first, the starting position $c_{initial}$ which will be used for the initial transmission is decided. Similar to the physical circular buffer, in the case where the sub-packet having the high code rate should be transmitted in the initial transmission, $\sigma_c$ columns of the matrix circular buffer are skipped such that the predetermined portion of the systematic bits is punctured, thereby deciding the starting position of the initial transmission. If the puncturing of the systematic bits is decided according to the code rate of the sub-packet used for the initial transmission as expressed by Equation 3, the starting position $c_{initial}$ is expressed by Equation 4. If an optimized $\sigma_c$ is present regardless of the code rate of the sub-packet, the starting position $c_{initial}$ may be fixed to $\sigma_c$. If the systematic bits are not punctured, $\sigma_c$ is 0.

$$c_{initial} = \sigma_c \cdot \lceil R_s/R_\theta \rceil \quad \text{Equation 6}$$

Next, a column index interval between the adjacent starting position candidates is decided in consideration of the variable length of the sub-packet in each HARQ transmission and the remaining starting positions are then decided. Accordingly, in the $i^{th}$ HARQ transmission, if the column index interval between the two adjacent starting positions is $\Delta_i$, the starting column index $c_{i,j}$ represented by $RV_i=j$ is expressed by Equation 5. The starting column index $c_{i,j}$ of Equation 5 indicates a bitwise index $R \cdot c_{i,j}$.

$$c_{i,j} = (j \cdot \Delta_i + c_{initial}) \bmod C$$

In Equation 7, mod indicates a modular operation.

FIG. 10 shows the starting column index $c_{i,1}$ and the starting column index $c_{i,2}$ operated by Equation 7. The column interval between $c_{i,1}$ and $c_{i,2}$ is the starting position interval $\Delta_i$. $\Delta_i$ of Equation 7 can be obtained by the following method in consideration of the filler bits and the dummy bits which are present in the circular buffer and the length of the sub-packet.

Figure 11:
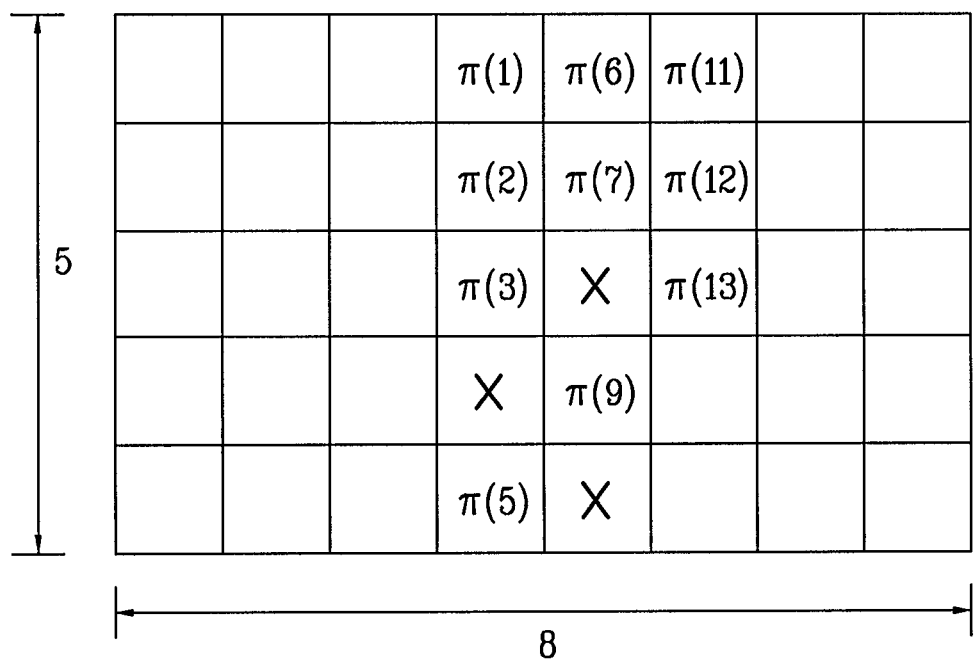
FIG. 11 is a view showing an example in which an initial starting position is 3 and a starting position interval is 2.

FIG. 11 is a view showing an example in which an initial starting position is 3 and a starting position interval is 2 in FIG. 10.

A first method of obtaining $\Delta_i$ of Equation 7 is as follows. In FIG. 11, the initial starting position $\sigma_c R=3*5=15$-bit indexes of $RV_i=0$ are skipped and the number of bit addresses of the matrix circular buffer is counted from $c_{i,j}$ to the length $L_i$ of the sub-packet column by column. At this time, the bit addresses corresponding to the dummy bits inserted for interleaving on the matrix buffer at the time of the generation of the sub-packet, the filler bits of the systematic bits of the FEC-encoded codeword, and the parity bits generated by the filler bits are excluded (skipped) at the time of counting. The number $\Delta_i$ of columns is obtained using $\sigma_c$ and the last bit address counted for generating the sub-packet having the length $L_i$ as shown in Table 2. In Table 2, the first method for operating the starting position interval is expressed by a pseudo code. Although floor is used in a last portion of Table 2, ceil or round may be used.

FIG. 11 shows a circular buffer having a 5×8 matrix shape and "X" indicates the dummy bits or filler bits to be skipped. FIG. 11 shows the case where $\sigma_c=3$ columns are skipped in consideration of the puncturing of the systematic bits in the initial transmission of the HARQ method, but, for simplification of calculation, $\sigma_c$ is set to 0.

If $L_i$ is 10, a fourth bit, an eighth bit and a tenth bit are skipped and 10 bits are read from the circular buffer up to a thirteen bit $\pi(13)$. According to the algorithm of Table 2, $\Delta_i$ becomes floor(13/5)−0=2. Accordingly, in the $i^{th}$ HARQ transmission, the sub-packets are read and generated from the circular buffer at an interval of 2 columns.

TABLE 2

```
l=0            // counter l = 0
k=σ·R          // the bit index k is the starting
position of RV_i=0
    while l < L_i    // repeated while a counter
l is less than the number of coded bits transmitted
    If π(k) is not a filler bit or dummy bit
    // check the positions of the filler bit and
the dummy bit
        l=l+1        // increase the counter
    end if
    k=k+1     // increase bit index column by
column
    end while
        Δ_i=floor(k / R)− σ  // operate the column
index
```

In Table 2, $\pi(k)$ denotes a bit value of the index k considering the interleaving pattern and k denotes the bit address of the circular buffer including the filler bit and the dummy bit and has a value in a range of $0 < k - R*C - 1$. l denotes a counter used for skipping the filler bit and the dummy bit.

That is, in the embodiment of the present invention, the process of deciding the starting position of the sub-packet in the transmission using the HARQ method includes a step of counting the number of bits excluding the dummy bits and the filler bits among the bits corresponding to the length of the sub-packet generated by the transmitter and a step of converting the counted value into a row interval or a column interval on the circular buffer. At this time, the step of counting the number of bits may include a step of setting a value obtained by multiplying the initial starting position by the size of the row or the column of the circular buffer to the initial value of the counted value as $k = \sigma_c \cdot R$ of Table 2.

A second method of obtaining $\Delta_i$ of Equation 7 is as follows. If it is assumed that $N_d$ dummy bits to be skipped at the time of accessing the circular buffer column by column, $N_f$ filler bits and parity bits generated by the filler bits are uniformly distributed in the matrix of the circular buffer, the number of columns necessary for generating the sub-packet having a length $L_i$ is calculated by Equation 8.

$$\Delta_i = \text{floor}\left(\frac{L_i}{R \cdot C - N_f - N_d} \cdot C\right) \quad \text{Equation 8}$$

That is, the process of deciding the starting position of the sub-packet of the transmission of the HARQ method in the embodiment of the present invention may include a step of dividing the length of the sub-packet generated by the transmitter by a value obtained by subtracting the number of dummy bits and the number of filler bits from the size of the circular buffer and a step of converting the divided value into the row interval or the column interval on the circular buffer.

Although floor is used in Equation 8, ceil or round may be used.

In the case where the dummy bits, the filler bits and the parity bits generated by the filler bits are not uniformly distributed in the matrix of the circular buffer, the number of dummy bits and the filler bits may be adjusted such that the starting position interval is calculated.

For example, the circular buffer having the matrix shape is constituted by three blocks. In the case where $N_f'$ filler bits are skipped in the two blocks and $N_d'$ dummy bits are skipped in the three blocks, the coefficients located in front of $N_f'$ and $N_d'$ are respectively adjusted to 2 and 3 such that the starting position interval is calculated.

$$\Delta_i = \text{floor}\left(\frac{L_i}{R \cdot C - 2N_f' - 3N_d'} \cdot C\right) \quad \text{Equation 9}$$

Similarly, although floor is used in Equation 9, ceil or round may be used.

As described above, according to the present invention, the starting position on the circular buffer can be simplified to a first row of a column or a first column of a row such that complexity can be reduced, in accordance with an intention of simplifying the operation by applying the matrix index when generating the sub-packet.

Although the optimized starting position interval is used for improving the performance at the high code rate, the performance at the low code rate is not influenced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method of re-transmitting a packet and more particularly, to a method of generating a sub-packet in consideration of an offset, which is capable of reducing complexity and improving a coding gain at the time of rate matching using a hybrid automatic repeat request (HARQ) method. The present invention is applicable to a mobile communication system and more particularly a transmitter.

The invention claimed is:

1. A method of generating a sub-packet according to an offset in order to perform hybrid automatic repeat request (HARQ) transmission of a codeword packet, the method comprising:
   turbo-coding an input bitstream at a predetermined code rate;
   generating systematic bits and parity bits, wherein the codeword packet includes the generated systematic bits and parity bits;
   storing the generated systematic bits and parity bits in a circular buffer; and
   determining a starting position of the sub-packet according to the offset for puncturing at least a portion of the systematic bits,
   wherein determining the starting position includes calculating a remainder by dividing a first value by a size of the circular buffer, and
   wherein calculating the first value includes multiplying a sub-packet identifier by a length of the sub-packet, for each HARQ transmission, and adding the offset to each multiplied value.

2. The method according to claim 1, further comprising transmitting starting position information using the sub-packet identifier.

3. The method according to claim 1, wherein the offset is a second value that varies according to the sub-packet identifier.

4. The method according to claim 1, wherein deciding the starting position further includes:
   determining the starting position of the sub-packet according to the offset in an initial transmission; and
   determining the starting position regardless the offset after the initial transmission.

5. The method according to claim 1, wherein deciding the starting position further includes:
   determining the starting position of the sub-packet regardless the offset in an initial transmission; and
   determining the starting position according to the offset after the initial transmission.

6. The method according to claim 1, wherein the determining of the starting position further comprises determining the starting position applying the following equation:

$$S_{i,j} = (j * L_i + S_{initial}) \bmod N$$

where $S_{i,j}$ is the starting position,
j is the sub-packet identifier,
$L_i$ is the length of the sub-packet for an $i^{th}$ HARQ transmission,
$S_{initial}$ is the offset, and
N is the size of the circular buffer.

7. The method according to claim 1, wherein the circular buffer has a matrix shape, including a number of rows (R) and a number of columns (C),
   wherein the offset is defined as an initial starting position of an initial transmission in a column row index unit by skipping at least one row or at least one column such that at least a portion of the systematic bits is punctured, and
   wherein determining the starting position further comprises deciding the starting position of the sub-packet in the column-row index unit according to the initial starting position.

8. The method according to claim 7, further comprising determining a starting position interval between two adjacent starting positions in a column-row index unit, wherein the starting position interval is configured to skip at least of dummy bits, filler bits, or parity bits generated by the filler bits, wherein the filler bits are inserted into the codeword.

9. The method according to claim 8, wherein deciding the starting position comprises:
   obtaining a dividend by multiplying the starting position interval by a sub-packet identifier and adding the initial starting position to the dividend; and
   determining a remainder obtained by dividing the dividend by C the starting position of the remaining sub-packet.

10. The method according to claim 8, wherein deciding the starting position interval further comprises:
    dividing the length of the sub-packet by a third value obtained by subtracting a number of dummy bits and a number of filler bits from the size of the circular buffer; and
    converting the divided value into a column interval of the circular buffer.

11. The method according to claim 10, wherein converting the divided value into the column interval comprises performing at least a floor, ceiling, or rounding function with respect to a fourth value obtained by multiplying the divided value by C.

12. The method according to claim 8, wherein deciding the starting position interval further comprises:
    counting a number of bits, excluding dummy bits and filler bits, among bits corresponding to the length of the sub-packet; and
    converting the counted number of bits into a column interval of the circular buffer.

13. The method according to claim 12, wherein counting the number of bits includes setting a fifth value obtained by multiplying the initial starting position by a size of an initial value of the counted number of bits (R).

14. The method according to claim 12, wherein converting the counted number of bits into the column interval includes performing at least a floor, ceiling, or rounding function with respect to a sixth value obtained by dividing the counted number of bits by R.

15. The method according to claim 1, further comprising:
    reading, from the circular buffer, the sub-packet having a predetermined length at the decided starting position; and
    transmitting the read sub-packet to a receiver.

16. The method according to claim 1, wherein the offset is set to 0 when a code rate of the sub-packet used for an initial transmission is lower than a predetermined threshold.

17. A transmitter configured to generate a sub-packet according to an offset, in order to perform hybrid automatic repeat request (HARQ) transmission of a codeword packet, the transmitter comprising:
    an encoder configured to turbo-code an input bitstream at a predetermined code rate;
    a generator configured to generate systematic bits and parity bits, and wherein the codeword packet includes the generated systematic bits and parity bits; and
    a circular buffer configured to store the generated systematic bits and parity bits,
    wherein a starting position of the sub-packet is determined according to the offset for puncturing at least a portion of the systematic bits,
    wherein determining the starting position includes calculating a remainder by dividing a first value by a size of the circular buffer, and
    wherein calculating the first value comprises multiplying a sub-packet identifier by a length of the sub-packet, for each HARQ transmission, and adding the offset to each multiplied value.

* * * * *